United States Patent
Kazi et al.

(10) Patent No.: US 10,681,135 B2
(45) Date of Patent: Jun. 9, 2020

(54) GENERATING SLICES FROM A BROADCAST MESSAGE AND A RECIPIENT IDENTITY

(71) Applicant: International Business Machines Corporation, Armonk, NY (US)

(72) Inventors: Asimuddin Kazi, Naperville, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 362 days.

(21) Appl. No.: 15/836,178

(22) Filed: Dec. 8, 2017

(65) Prior Publication Data
US 2019/0182321 A1    Jun. 13, 2019

(51) Int. Cl.
*H04L 29/08*    (2006.01)
*G06F 3/06*    (2006.01)
*H04L 9/08*    (2006.01)

(52) U.S. Cl.
CPC ........ *H04L 67/1097* (2013.01); *G06F 3/0619* (2013.01); *H04L 9/0894* (2013.01); *H04L 9/0861* (2013.01); *H04L 67/06* (2013.01); *H04L 2209/34* (2013.01)

(58) Field of Classification Search
CPC .. H04L 67/1097; H04L 9/0894; G06F 3/0619
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Matthew M Kim
*Assistant Examiner* — Indranil Chowdhury
(74) *Attorney, Agent, or Firm* — James Nock; Andrew D. Wright; Roberts Calderon Safran & Cole, P.C.

(57) ABSTRACT

A method begins by a dispersed storage (DS) processing unit of a dispersed storage network (DSN) transmitting a write request to a set of storage units of the DSN. The write request is requesting DS error encoding of a data segment of a data object. The method continues by a first storage unit interpreting the write request to determine a DS error encoding function and a first pillar number of the DS error encoding. The method continues by the first storage unit executing the DS error encoding on at least a first portion of the data segment using at least a first portion of an encoding matrix to produce a first encoded data slice that corresponds to the first pillar number. The method continues by the first storage unit storing the first encoded data slice and sending an acknowledgement of storage to the DS processing unit.

20 Claims, 6 Drawing Sheets

(56) References Cited

U.S. PATENT DOCUMENTS

| | | | |
|---|---|---|---|
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2015/0242272 | A1* | 8/2015 | Resch .................. G06F 16/86 |
| | | | 714/764 |
| 2016/0321136 | A1* | 11/2016 | Baptist .................. G06F 3/067 |
| 2016/0378405 | A1* | 12/2016 | Resch ................ G06F 11/1092 |
| | | | 711/114 |
| 2016/0378586 | A1* | 12/2016 | Cocagne .............. G06F 16/182 |
| | | | 714/57 |
| 2017/0006104 | A1* | 1/2017 | Motwani ............ G06F 11/1076 |
| 2017/0140018 | A1* | 5/2017 | Abhijeet ............... G06F 3/0619 |
| 2017/0160945 | A1* | 6/2017 | Kazi ................... H04L 67/1097 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

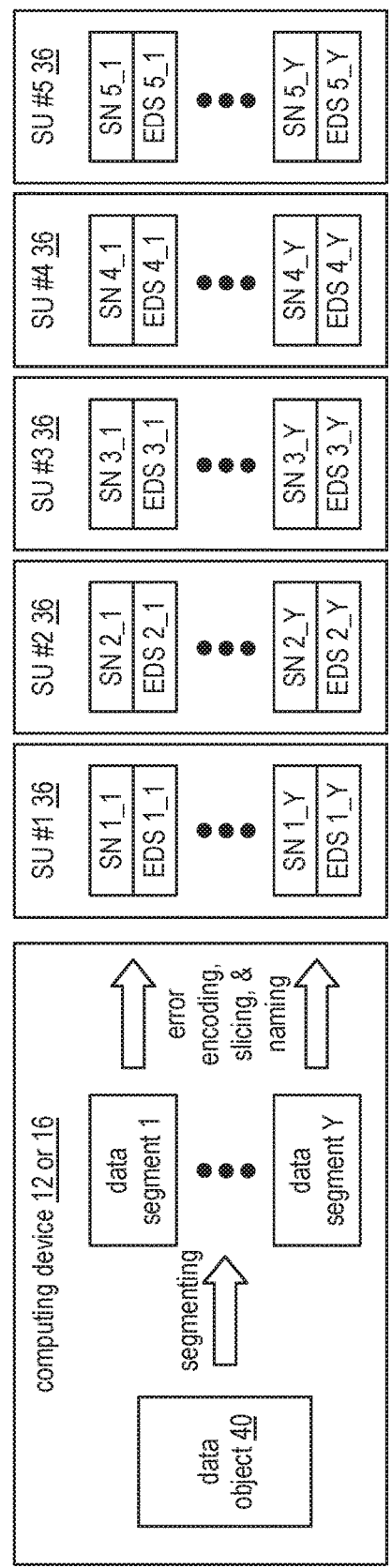
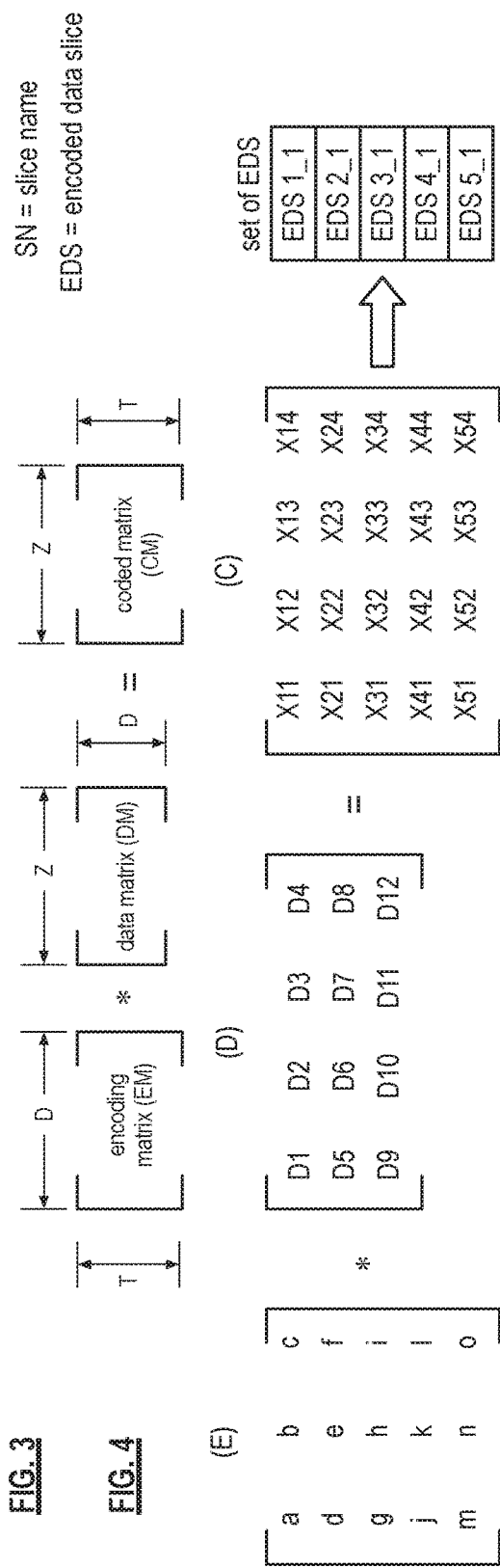
FIG. 3
FIG. 4
FIG. 5
FIG. 6

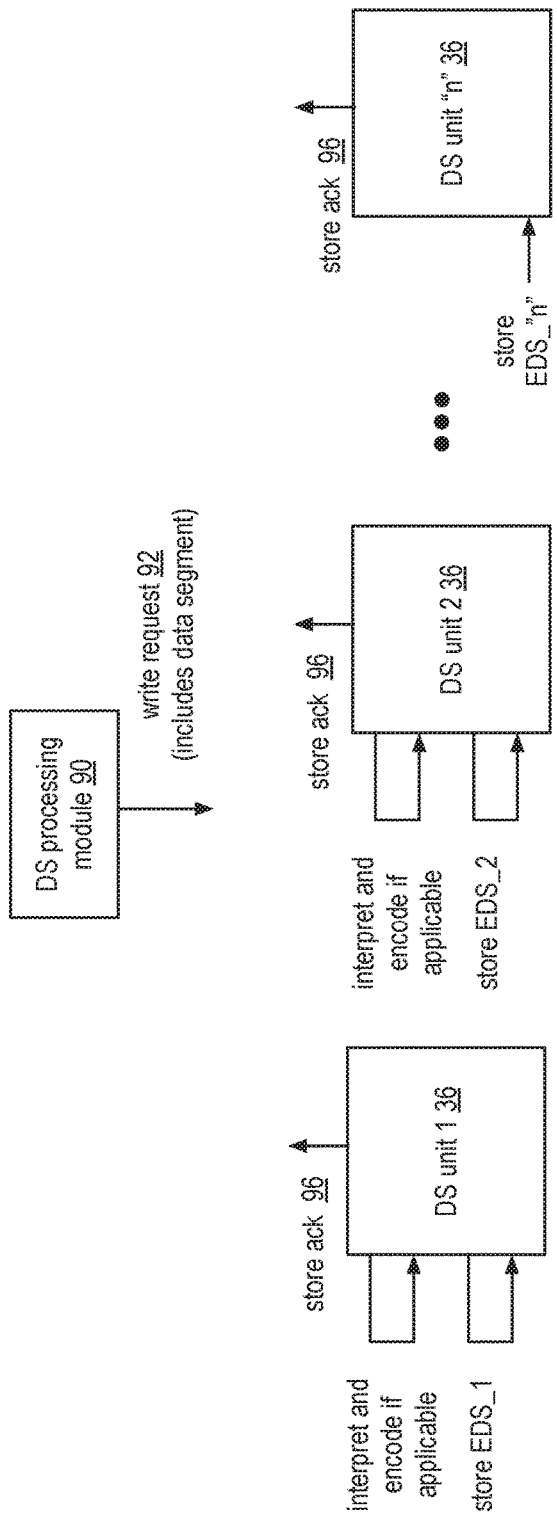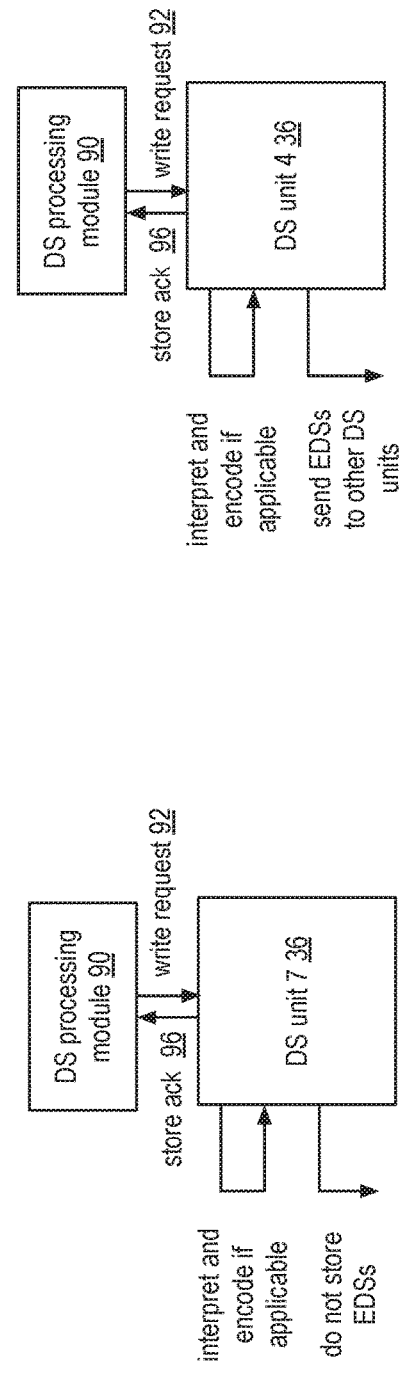

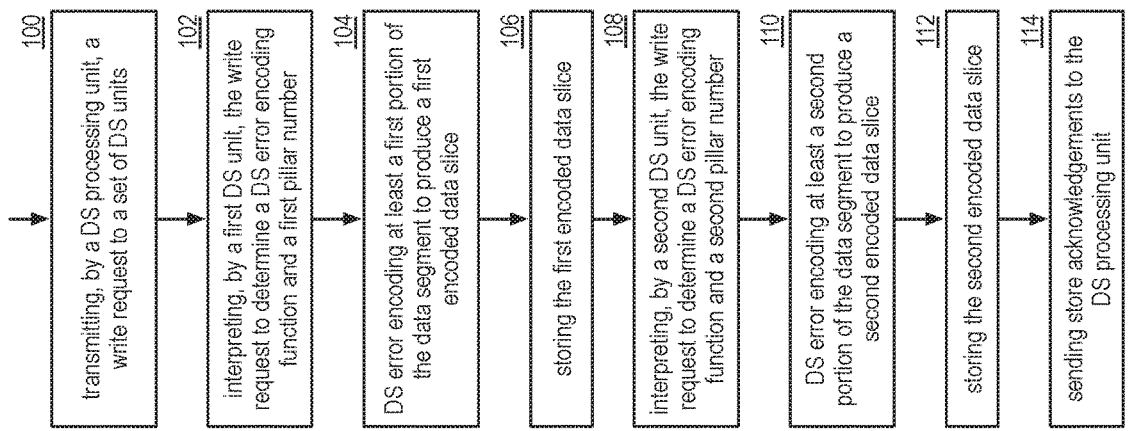

GENERATING SLICES FROM A BROADCAST MESSAGE AND A RECIPIENT IDENTITY

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9A is a schematic block diagram of an example of sending a write request in accordance with the present invention;

FIG. 9B is a schematic block diagram of another example of sending a write request in accordance with the present invention;

FIG. 9C is a schematic block diagram of another example of sending a write request in accordance with the present invention; and FIG. 10 is a logic diagram of an example of a method of sending a write request in accordance with the present invention.

DETAILED DESCRIPTION OF THE INVENTION

Figure 1:
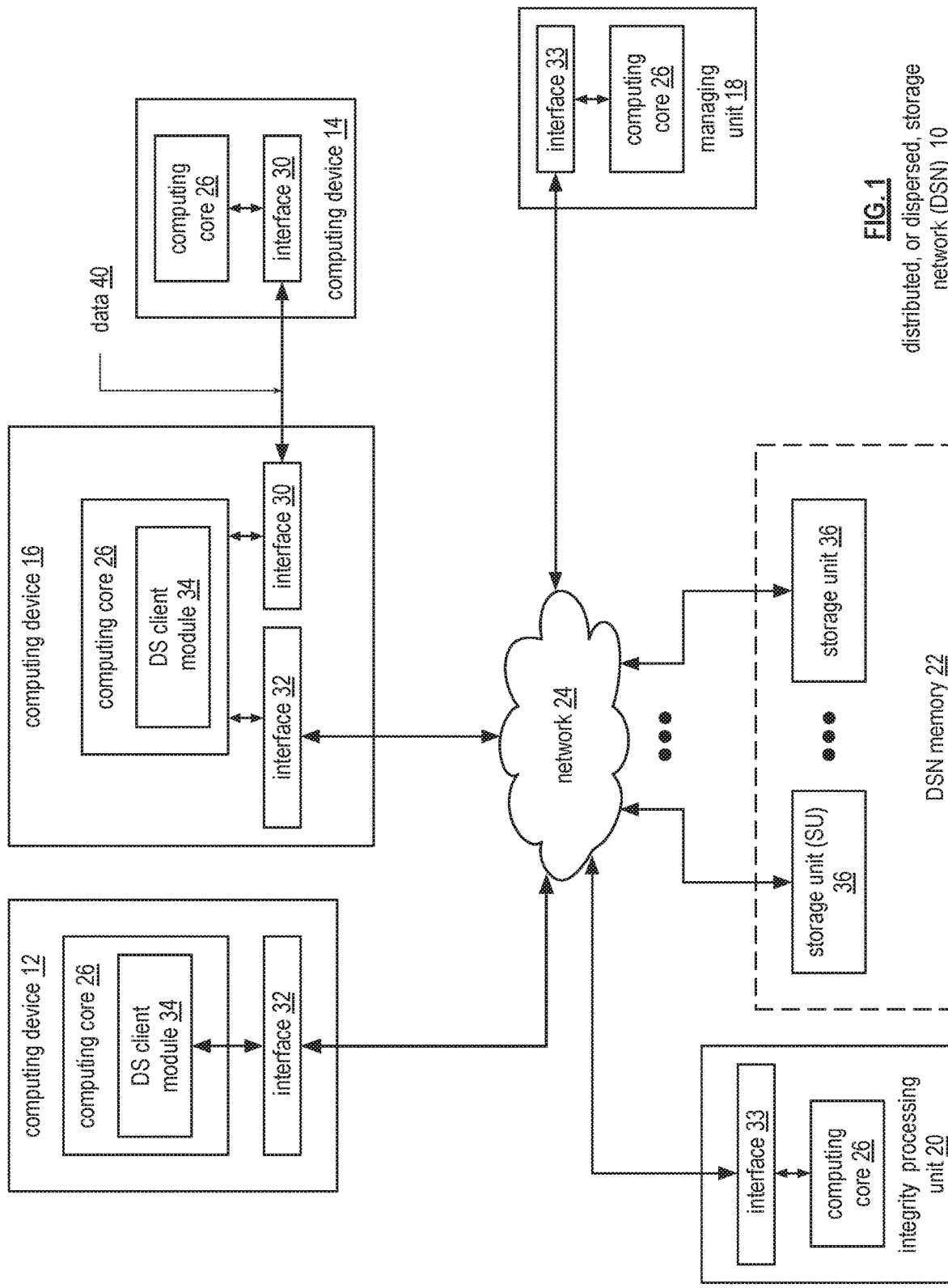
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
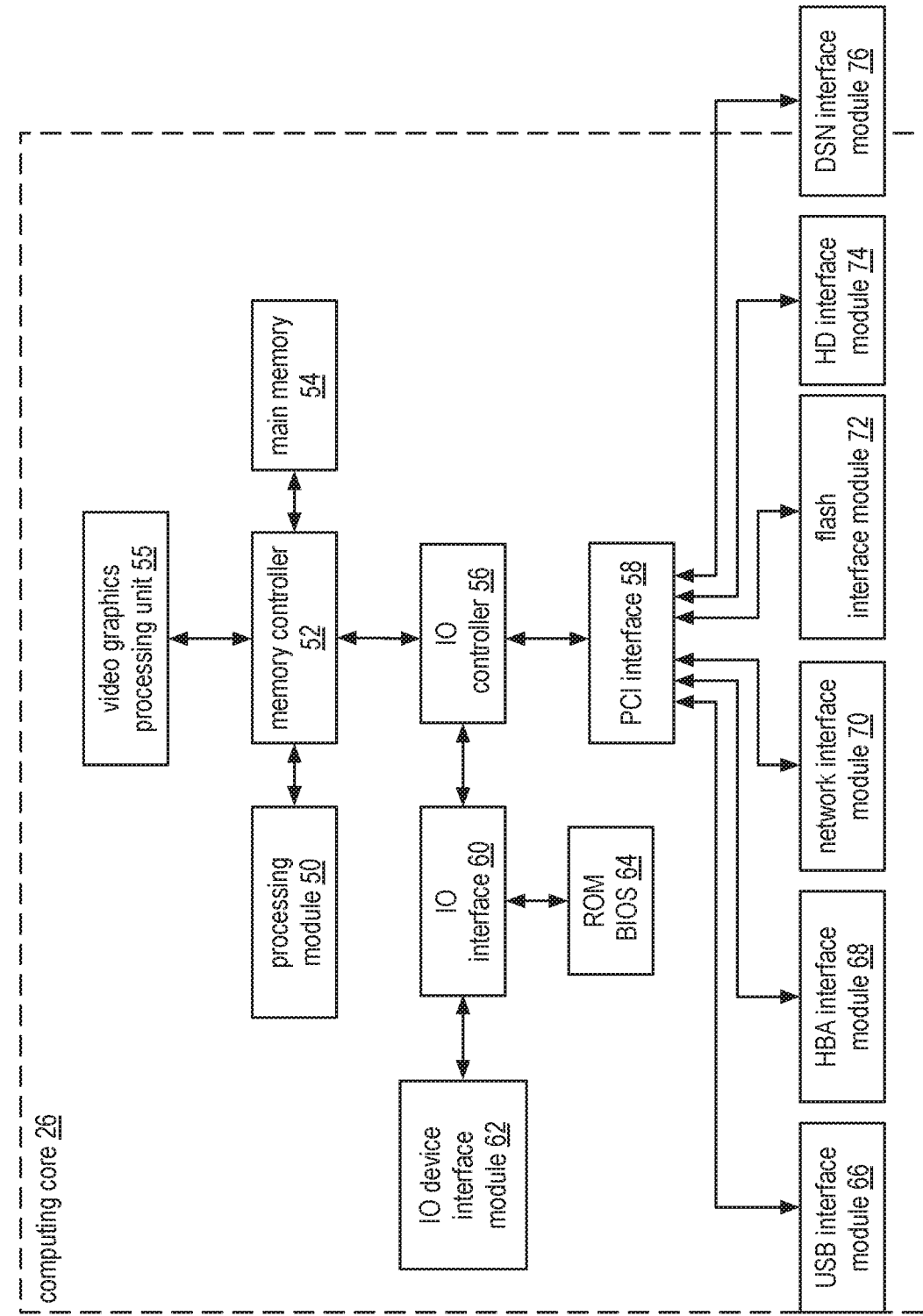
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data 40 on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
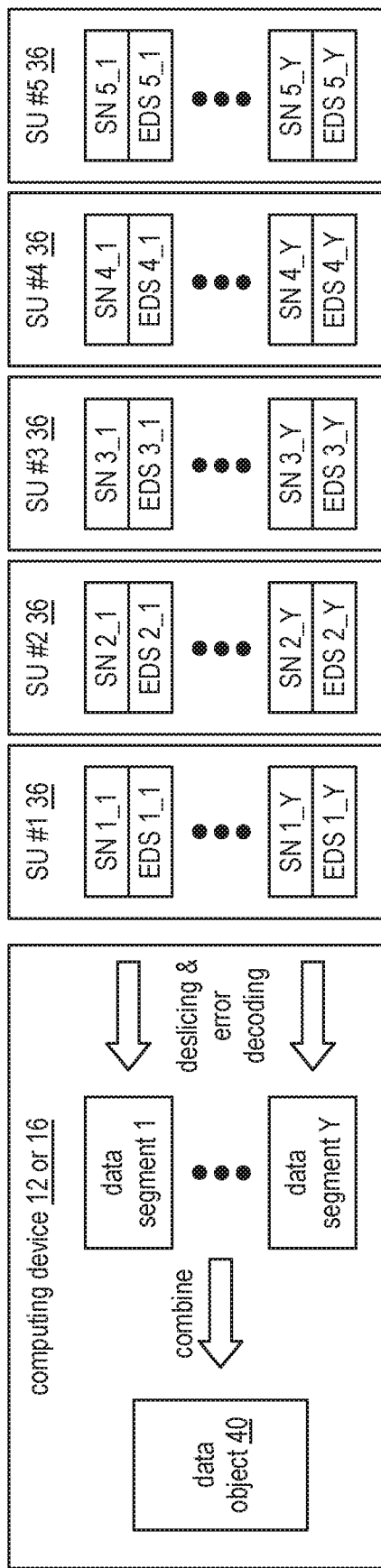
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
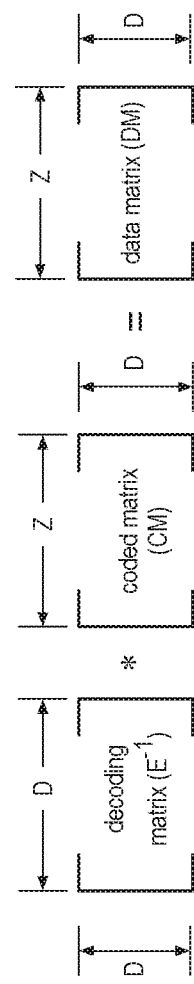
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIGS. 9A-9C are schematic block diagrams of examples of sending a write request 92 to a set of storage units 36 of a dispersed storage network (DSN). The DSN includes a dispersed storage (DS) processing module 90 and DS units 1-n 36. The write request 92 includes a data segment of a data object and a source name regarding the data object. Each of the DS units may function as one of the storage units 36 of FIG. 1 and the DS processing module 90 may function as the DS client module 34 or one of the computing devices 12-16 of FIG. 1.

In an example of operation of FIG. 9A, the DS processing module 90 transmits (e.g., by broadcasting, by multicasting, etc) a write request 92, which requests DS error encoding of a data segment, to the set of DS units 1-n 36 of the DSN. Each DS unit 36 of the set of DS units 36 that receives the write request 92 interprets the write request 92 to determine a DS error encoding function and a pillar number (e.g. based on an assigned address range for the respective DS unit) of a plurality of pillar numbers of the DS error encoding. For example, the first DS unit 1 36 interprets the write request 92 to determine the DS error encoding function and a first pillar number of the DS error encoding. As another example, the second DS unit 2 36 interprets the write request 92 to determine the DS error encoding function and a second pillar number of the DS error encoding. Note the write request 92 includes one or more of the data segment, a source name, identity of the DS error encoding, identity of the encoding matrix, assignment of the plurality of pillar numbers to the set of storage units, identity of each portion of the data segment, and identity of each portion of the encoding matrix. Further note the source name is a portion (e.g., one or more of the vault identifier, the data object identifier, and the revision information) of the slice name 80.

Once a DS unit 36 interprets the write request that indicates encoding, the DS unit 36 executes the DS error encoding on at least a portion of the data segment using at least a portion of an encoding matrix (e.g., of FIGS. 4-5) to produce an encoded data slice. For example, the first storage unit (e.g., DS unit 1 36) executes the DS error encoding on at least a first portion of the data segment using at least a first portion of an encoding matrix to produce a first encoded data slice (e.g., EDS_1) that corresponds to the first pillar number. Note the encoding matrix relates to the DS error encoding function. Alternatively, a DS unit may interpret the write request 92 to indicate the DS unit is not to store an encoded data slice, or is to encode and send an encoded data slice to another DS unit 36, which is discussed in greater detail with reference to FIGS. 9B-9C.

Having produced an encoded data slice, the DS unit 36 then stores its respective encoded data slice and sends a store acknowledgement 96 to the DS processing module 90. Once the DS processing module receives greater than or equal to a write threshold number of store acknowledgements 96, the DS processing module 90 concludes the write operation is successful. If the DS processing module 90 does not receive at least the write threshold number of store acknowledgements 96 (e.g., within a timeframe), the DS processing module 90 may retry the write request 92 in accordance with a retry protocol (e.g., rebuild and send an encoded data slice, resend the write request, send a rollback request, create and send another encoded data slice, etc).

In an example of operation of FIG. 9B, DS unit 7 36 interprets write request 92 and determines the DS error encoding function to be a null storage function (e.g., not to perform a process for the data segment). As another example, DS unit 7 36 determines it is not responsible for storing at least one encoded data slice by interpreting a source name from the write request 92 is not the source name for which it is responsible to store. Alternatively, or in addition to, the DS unit 7 36 may interpret the write request 92 and determine to forward the write request 92 to another DS unit of the set of storage units.

In an example of operation of FIG. 9C, DS unit 4 36 interprets write request 92 and determines the DS error encoding function, a third pillar number that is associated with DS unit 3 36, and a fourth pillar number that is associated with DS unit 4 36. The write request also includes an instruction for DS unit 4 to disperse storage error encode data received in the write request 92 to produce third and fourth encoded data slices of a set of encoded data slices and, after executing the encoding, to send the third encoded data slice to the third DS unit 3 36 for storage, and to store the fourth encoded data slice in DS unit 4 36. Thus, the DS unit 4 36 generates a third and fourth encoded data slice, stores the fourth encoded data slice, and sends the third encoded data slice to DS unit 3 36 for storage.

As another example of operation, DS unit 4 36 interprets write request 92 and determines the DS error encoding function, a nth pillar number that is associated with DS unit n 36. The DS unit 4 36 then creates an encoded data slice (e.g., EDS_n) and sends EDS_n to DS unit n 36 for storage. Upon successful storage of EDS_n, DS unit n 36 sends an acknowledgement of storage to DS processing module 90.

As another example of operation, the DS unit 4 36 interprets write request 92 and determines the DS error encoding function (e.g., Cauchy Reed-Solomon), a third pillar number that is associated with DS unit 3 36, and a fourth pillar number that is associated with DS unit 4 36. The DS unit 4 36 also determines whether DS unit 3 36 is within a proximity threshold (e.g., one or more of: a common site, a common local area network, a common wireless local area network, a common wide area network, a common cellular network, a communication latency, and a physical distance) and is to store a portion of the data segment. For example, DS unit 4 36 determines that the DS unit 3 36 is within the proximity threshold, when the write request indicates the proximity threshold is a common site, by determining DS unit 3 36 is at the same site as DS unit 4 36. As another example, the DS unit 4 36 determines the DS unit 3 36 is not within a proximity threshold of a common cellular network, when the DS unit 3 36 is part of a common local area network, but is not part of a common cellular network. As a yet further example, the DS unit 4 36 determines the DS unit 3 36 is within the proximity threshold when DS unit 3 36 is within 5 miles and is part of a common wide area network.

FIG. 10 is a logic diagram of an example of a method of transmitting (e.g., broadcasting, multicasting, etc.) a write request. The method begins with step 100, where a DS processing unit of a dispersed storage network (DSN) transmits a write request, regarding DS error encoding of a data segment of a data, to a set of dispersed storage (DS) units of the DSN. The write request includes one or more of the data segment, a source name, identity of the DS error encoding, identity of the encoding matrix, assignment of the plurality of pillar numbers to the set of storage units, identity of each portion of the data segment, and identity of each portion of the encoding matrix.

The method continues with step 102, where a first DS unit interprets the write request to determine a DS error encoding function and a first pillar number of a plurality of pillar numbers of the DS error encoding. As an example of interpreting the write request, the first DS unit extracts a source name (e.g., vault identifier, data object identifier, revision info, etc.) of the data object from the write request and determines whether the first DS unit is responsible for storing encoded data slices associated with the source name. When responsible for storing encoded data slices associated with the source name, the first DS unit determines the DS error encoding and the first pillar number. When not responsible for storing encoded data slices associated with the source name, the first DS unit determines the DS error encoding to be a null storage function (e.g., determine to end process of request, determine not to perform any function for the data segment, etc.).

The method continues with step 104, where the first DS unit executes the DS error encoding on at least a first portion of the data segment using at least a first portion of an encoding matrix to produce a first encoded data slice that corresponds to the first pillar number, wherein the encoding matrix is in accordance with the DS error encoding. As an example of the executing, the first DS unit obtains (e.g., creates, generates, receives, etc.) a data matrix. The data matrix is created by dividing the data segment into a plurality of data blocks and arranging the plurality of data blocks into rows and columns. The first DS unit then executes the DS error encoding by matrix multiplying the data matrix with the encoding matrix to produce a set of encoded data slices and selects the first encoded data slice. The first DS unit then stores the first encoded data slice of the set of encoded data slices. In addition, the first DS unit may send a third encoded data slice of the set of encoded data slices to a third storage unit of the set of storage units for storage. As an example, the first storage unit may determine whether the third storage unit is within a proximity threshold and is to store a portion of the data segment. When the third DS unit is within the proximity threshold (e.g., same site, common local area network, common wireless local area network, common wide area network, common cellular network, within a communication latency threshold, within a physical distance threshold, etc.) and is to store the portion of the data segment, sending the third encoded data slice to the third storage unit. When the third DS unit is either not within the proximity threshold or is not to store the portion of the data segment, the DS unit may determine not to send the third encoded data slice.

As another example, the first DS unit produces the first encoded data slice by determining a pillar number based on the write request, obtaining a row of an encoding matrix based on the pillar number, obtaining a data matrix that includes rows and columns of data block resulting from dividing the data segment into a plurality of blocks, and matrix multiplying a row of the data matrix with the row of the encoding matrix to produce the first encoded data slice.

The method continues with step 106, where the first DS unit stores the first encoded data slice. As an example, the first DS unit generates a first slice name for the first encoded data slice which includes the first pillar number, a first data segment identifier, a first vault identifier and a first data object identifier.

The method continues with step 108, where a second DS unit interprets the write request to determine a DS error encoding function and a second pillar number of a plurality of pillar numbers of the DS error encoding. The method continues with step 110, where the second DS unit executes the DS error encoding on at least a second portion of the data segment using at least a second portion of an encoding matrix to produce a second encoded data slice that corresponds to the second pillar number, wherein the encoding matrix is in accordance with the DS error encoding.

The method continues with step 112, where the second DS unit stores the second encoded data slice. The method continues with step 114, where the first and second DS units, after storing the first and second encoded data slices, each send to the DS processing unit, an acknowledgement of storing a respective encoded data slice. Note one or more of the second data segment identifier, the second vault identifier and the second data object identifier may be substantially similar to a respective one of the first data segment identifier, the first vault identifier and the first data object identifier.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:

transmitting, by a dispersed storage (DS) processing unit of a dispersed storage network (DSN), a write request to a set of storage units of the DSN, wherein the write request is requesting DS error encoding of a data segment of a data object;

interpreting, by a first storage unit of the set of storage units, the write request to determine a DS error encoding function and a first pillar number of a plurality of pillar numbers of the DS error encoding;

executing the DS error encoding, by the first storage unit, on at least a first portion of the data segment using at least a first portion of an encoding matrix to produce a first encoded data slice that corresponds to the first pillar number, wherein the encoding matrix is in accordance with the DS error encoding;

storing, by the first storage unit, the first encoded data slice;

interpreting, by a second storage unit of the set of storage units, the write request to determine the DS error encoding and a second pillar number of the plurality of pillar numbers;

executing the DS error encoding, by the second storage unit, on at least a second portion of the data segment using at least a second portion of the encoding matrix to produce a second encoded data slice that corresponds to the second pillar number; and storing, by the second storage unit, the second encoded data slice.

2. The method of claim 1, wherein the write request comprises one or more of:

the data segment;
a source name;
identity of the DS error encoding;
identity of the encoding matrix;
assignment of the plurality of pillar numbers to the set of storage units;

identity of each portion of the data segment; and
identity of each portion of the encoding matrix.

3. The method of claim 1, wherein the interpreting, by the first storage unit, the write request comprises:
extracting a source name of the data object from the write request; and
determining whether the first storage unit is responsible for storing encoded data slices associated with the source name:
when the first storage unit is responsible for storing encoded data slices associated with the source name, determining the DS error encoding and the first pillar number; and
when the first storage unit is not responsible for storing encoded data slices associated with the source name, determining the DS error encoding to be a null storage function.

4. The method of claim 1, wherein the executing the DS error encoding, by the first storage unit, comprises:
obtaining a data matrix, wherein the data segment is divided into a plurality of data blocks, wherein the plurality of data blocks are arranged into rows and columns to create the data matrix;
executing the DS error encoding by matrix multiplying the data matrix with the encoding matrix to produce a set of encoded data slices; and
selecting the first encoded data slice from the set of encoded data slices.

5. The method of claim 4 further comprises:
storing, by the first storage unit, the first encoded data slice of the set of encoded data slices; and
sending, by the first storage unit, a third encoded data slice of the set of encoded data slices to a third storage unit of the set of storage units for storage therein.

6. The method of claim 5 further comprises:
determining whether the third storage unit is within a proximity threshold and is to store a portion of the data segment; and
when the third storage unit is within the proximity threshold and is to store the portion of the data segment, sending the third encoded data slice to the third storage unit.

7. The method of claim 6, wherein the proximity threshold includes one or more of:
a common local area network;
a common wireless local area network;
a common wide area network;
a common cellular network;
a common site;
a communication latency; and
a physical distance.

8. The method of claim 1, wherein the executing the DS error encoding, by the first storage unit, comprises:
determining a pillar number based on the write request;
obtaining a row of an encoding matrix based on the pillar number;
obtaining a data matrix that includes rows and columns of data blocks, wherein the data segment is divided into a plurality of data blocks; and
matrix multiplying a row of the data matrix with the row of the encoding matrix to produce the first encoded data slice.

9. The method of claim 1, wherein the storing comprises:
generating, by the first storage unit, a first slice name for the first encoded data slice; and
generating, by the second storage unit, a second slice name for the second encoded data slice, wherein each of the first and second slice names includes the respective pillar number, a data segment identifier, a vault identifier, and a data object identifier.

10. The method of claim 1 further comprises:
sending, by the first storage unit, an acknowledgment of storing the first encoded data slice to the DS processing unit; and
sending, by the second storage unit, an acknowledgment of storing the second encoded data slice to the DS processing unit.

11. A non-transitory computer readable memory device comprises:
a first memory section for storing operational instructions that, when executed by a dispersed storage (DS) processing unit of a dispersed storage network (DSN), causes the DS processing unit to:
transmit a write request to a set of storage units of the DSN, wherein the write request is requesting DS error encoding of a data segment of a data object;
a second memory section for storing operational instructions that, when executed by a first storage unit of the set of storage units, causes the first storage unit to:
interpret the write request to determine a DS error encoding function and a first pillar number of a plurality of pillar numbers of the DS error encoding;
execute the DS error encoding on at least a first portion of the data segment using at least a first portion of an encoding matrix to produce a first encoded data slice that corresponds to the first pillar number, wherein the encoding matrix is in accordance with the DS error encoding;
store the first encoded data slice;
a third memory section for storing operational instructions that, when executed by a second storage unit of the set of storage units, causes the second storage unit to:
interpret the write request to determine the DS error encoding and a second pillar number of the plurality of pillar numbers;
execute the DS error encoding on at least a second portion of the data segment using at least a second portion of the encoding matrix to produce a second encoded data slice that corresponds to the second pillar number; and
store the second encoded data slice.

12. The computer readable memory device of claim 11, wherein the write request comprises one or more of:
the data segment;
a source name;
identity of the DS error encoding;
identity of the encoding matrix;
assignment of the plurality of pillar numbers to the set of storage units;
identity of each portion of the data segment; and
identity of each portion of the encoding matrix.

13. The computer readable memory device of claim 11, wherein the second memory section stores further operational instructions that, when executed by the first storage unit, causes the first storage unit to interpret the write request by:
extracting a source name of the data object from the write request; and
determining whether the first storage unit is responsible for storing encoded data slices associated with the source name:

when the first storage unit is responsible for storing encoded data slices associated with the source name, determining the DS error encoding and the first pillar number; and when the first storage unit is not responsible for storing encoded data slices associated with the source name, determining the DS error encoding to be a null storage function.

14. The computer readable memory device of claim 11, wherein the second memory section stores further operational instructions that, when executed by the first storage unit, causes the first storage unit to execute the DS error encoding by:

obtaining a data matrix, wherein the data segment is divided into a plurality of data blocks, wherein the plurality of data blocks are arranged into rows and columns to create the data matrix;

executing the DS error encoding by matrix multiplying the data matrix with the encoding matrix to produce a set of encoded data slices; and selecting the first encoded data slice from the set of encoded data slices.

15. The computer readable memory device of claim 14, wherein the second memory section stores further operational instructions that, when executed by the first storage unit, causes the first storage unit to:

store the first encoded data slice of the set of encoded data slices; and send a third encoded data slice of the set of encoded data slices to a third storage unit of the set of storage units for storage therein.

16. The computer readable memory device of claim 15, wherein the second memory section stores further operational instructions that, when executed by the first storage unit, causes the first storage unit to:

determine whether the third storage unit is within a proximity threshold and is to store a portion of the data segment; and when the third storage unit is within the proximity threshold and is to store the portion of the data segment, send the third encoded data slice to the third storage unit.

17. The computer readable memory device of claim 16, wherein the proximity threshold includes one or more of:

a common local area network;
a common wireless local area network;
a common wide area network;
a common cellular network;
a common site;
a communication latency; and
a physical distance.

18. The computer readable memory device of claim 11, wherein the second memory section stores further operational instructions that, when executed by the first storage unit, causes the first storage unit to perform the DS error encoding by:

determining a pillar number based on the write request;
obtaining a row of an encoding matrix based on the pillar number;
obtaining a data matrix that includes rows and columns of data blocks, wherein the data segment is divided into a plurality of data blocks; and
matrix multiplying a row of the data matrix with the row of the encoding matrix to produce the first encoded data slice.

19. The computer readable memory device of claim 11, wherein the storing by the first and second memory sections comprises:

the second memory section storing further operational instructions that, when executed by the first storage unit, causes the first storage unit to generate a first slice name for the first encoded data slice, wherein the first slice name includes the first pillar number, a first data segment identifier, a first vault identifier, and a first data object identifier; and the third memory section storing further operational instructions that, when executed by the second storage unit, causes the second storage unit to generate a second slice name for the second encoded data slice, wherein the second slice name includes the second pillar number, a second data segment identifier, a second vault identifier, and a second data object identifier.

20. The computer readable memory device of claim 11 further comprises:

the second memory section storing further operational instructions that, when executed by the first storage unit, causes the first storage unit to send an acknowledgment of storing the first encoded data slice to the DS processing unit; and the third memory section storing further operational instructions that, when executed by the second storage unit, causes the second storage unit to send an acknowledgment of storing the second encoded data slice to the DS processing unit.

* * * * *